Figure 1:
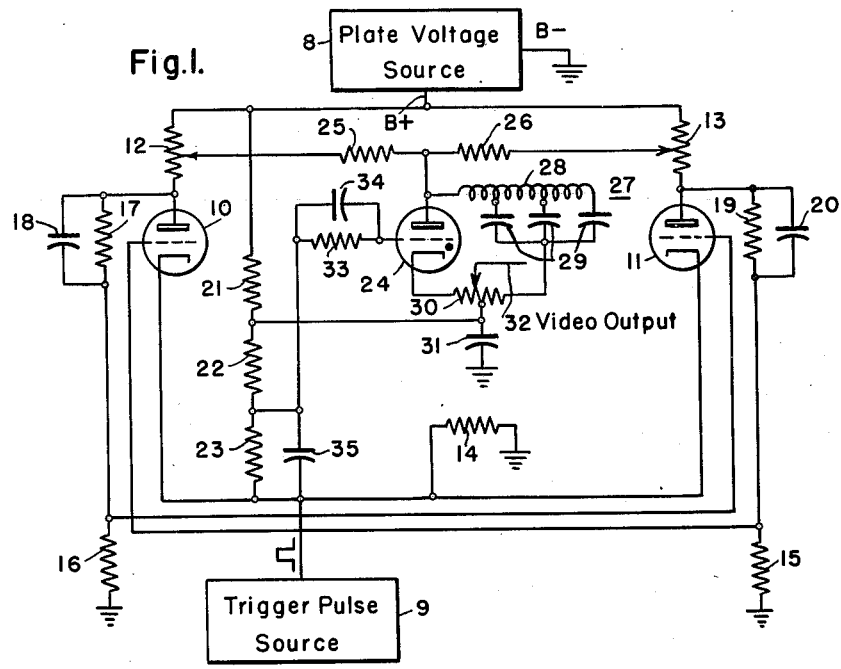

Sept. 18, 1951     J. W. TAYLOR, JR., ET AL     2,568,419

PULSE GENERATING CIRCUITS

Filed Feb. 10, 1950

WITNESSES:
E. A. McCloskey
Kw. C. Groome

INVENTORS
John W. Taylor, Jr. and
William S. Parnell.
BY
J. E. Browder
ATTORNEY

Patented Sept. 18, 1951

2,568,419

UNITED STATES PATENT OFFICE 2,568,419

PULSE GENERATING CIRCUITS

John W. Taylor, Jr., and William S. Parnell, Baltimore, Md., assignors to Westinghouse Electric Corporation, East Pittsburgh, Pa., a corporation of Pennsylvania Application February 10, 1950, Serial No. 143,504

9 Claims. (Cl. 250—27)

This invention relates to pulse generating circuits, and it relates more particularly to circuits for generating pulses in target simulators for testing radar systems.

In a radar system using a lobing antenna for obtaining directional information, transmitted energy is received alternately on one of two beams, the difference in the intensity of the two signals being used to determine the direction in which the antenna must turn in order to point at a target. For testing such a system, a target simulator is required to provide pulses delayed in time from the transmitted pulses, the delay corresponding to the range of the simulated target.

Both radio frequency and video pulses should be provided by such a simulator, the former for testing the complete radar system, and the latter for testing the components past the video detector, which components are generally the ones which interpret the information provided by the difference in intensity between alternate pulses, and which instruct the antenna to turn in the direction necessary to keep it pointing at the target. This invention provides a pulse generator which delivers pulses, which have different intensities, and which may be used in such a target simulator.

In one embodiment of the invention, a scale-of-two multivibrator is used with a pulse generator of the thyratron open-circuited transmission line type, the multivibrator and the thyratron being triggered simultaneously, the multivibrator causing the voltage to which the pulse-forming network is charged to vary on alternate pulses.

In another embodiment of the invention, the multivibrator is triggered through a counting circuit which causes the switching of the multivibrator to occur after a predetermined number of pulses, this embodiment of the invention being suited for use with the type of radar system in which the antenna is not lobed for every other pulse, but receives several pulses on one beam before switching to the other.

An object of this invention is to generate pulses having different amplitudes.

Another object of this invention is to generate pulses, alternate of which have different amplitudes.

Another object of the invention is to generate a first series of pulses having the same amplitude followed by a second series of pulses having the same amplitude which is different from the amplitude of the first series of pulses.

Another object of this invention is to charge a pulse-forming network to different voltages.

Figure 2:
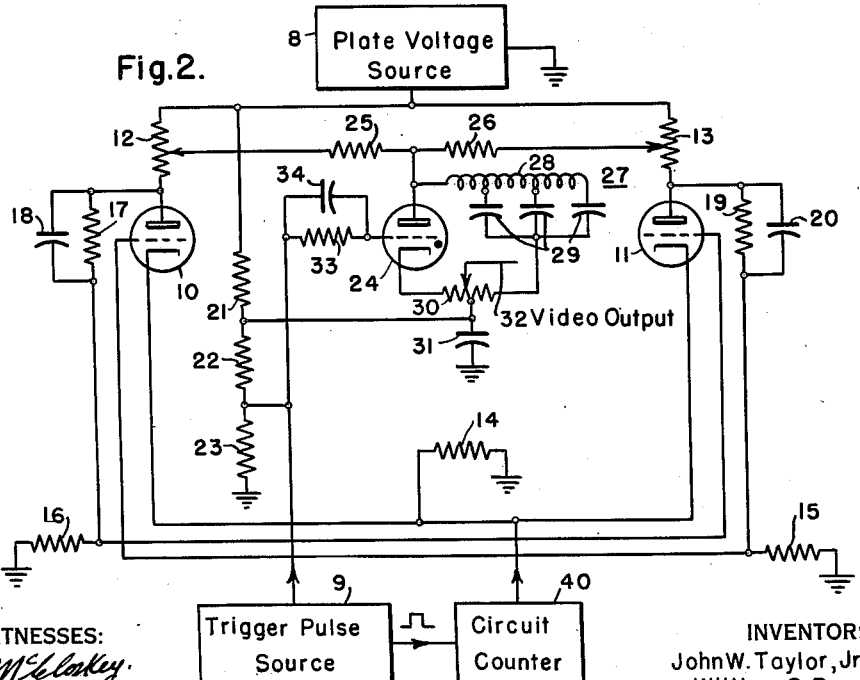

The invention will now be described with reference to the drawing, of which:

Fig. 1 is a circuit schematic illustrating one embodiment of this invention in which a pulse-forming network delivers pulses, alternate of which have different amplitudes, and Fig. 2 is a circuit schematic of another embodiment of this invention in which a pulse-forming network delivers a first series of pulses having one amplitude followed by a second series of pulses having a different amplitude.

The triode tubes 10 and 11, which may be two sections of a dual triode such as a 6J6, are connected in a scale-of-two multivibrator circuit. Their plates are connected through potentiometers 12 and 13 to a positive terminal of a conventional plate voltage source 8. Their cathodes are connected together and through the resistor 14 to ground.

The grid of tube 10 is connected to the plate of tube 11 through the parallel combination of resistor 19 and capacitor 20 and to ground through resistor 15. Likewise, the grid of tube 11 is connected to the plate of tube 10 through the parallel combination of resistor 17 and capacitor 18 and to ground through resistor 16.

The series-connected resistors 21, 22, and 23 are connected between the positive terminal of the plate voltage source and the cathodes of tubes 10 and 11, and serve as a voltage divider. This divider places the cathode of tube 24 at the proper voltage level so that the desired variation in pulse amplitude is within the range of the potentiometers; this arrangement also provides negative grid-to-cathode bias for tube 24.

The thyratron tube 24 has its plate connected to the junction point of the series-connected resistors 25 and 26 which are connected to the sliders of the potentiometers 12 and 13. The plate of the tube 24 is also connected to the pulse-forming network 27, which is of the open-ended transmission line type and which comprises the inductor 28 having the capacitors 29 connected to taps therein. The capacitors 29 are connected together and to one end of the center-tapped potentiometer 30, the other end of which is connected to the cathode of the tube 24.

The center tap of the potentiometer 30 is connected through the capacitor 31 to ground, and to the junction point of the resistors 21 and 22. The slider 32 of the potentiometer 30 is a video output connection.

The grid of the tube 24 is connected through the resistor 33 which is shunted by the capacitor 34 to the junction point of the resistors 22 and 23, and through the capacitor 35 to the cathodes of the tubes 10 and 11.

In operation, when a positive trigger pulse from a conventional trigger source 9 is applied to the cathodes of the multivibrator tubes 10 and 11, one of the tubes becomes less conductive, tube 10, for example. The resulting decrease of flow through the tube 10 causes the voltage at its plate to increase, and this increases the voltage on the directly-coupled grid of tube 11, increasing its conductivity. The resulting increase of current flow through tube 11 causes the voltage on its plate to decrease and to decrease the voltage on the directly-coupled grid of tube 10, decreasing the conductivity of tube 10. This continues until tube 10 is cut off and tube 11 conducts all the current. The current is then stable until the next trigger pulse is applied to the cathodes of the tubes; then the tube 10 will conduct all of the current and will stop conduction in the tube 11. The current then makes a complete cycle for every two trigger pulses, as is usual with scale-of-two multivibrator circuits.

The network 27 is charged through the resistors 25 and 26 and the potentiometers 12 and 13. When the tube 10 is conducting, the potentiometer 12 will control the voltage to which the network is charged, and on the next pulse when the tube 11 is conducting, the potentiometer 13 will control the voltage to which the network is charged.

The potentiometer 30 is the resistance through which the network 27 is terminated and has a resistance equal to the characteristic resistance of the network.

The positive trigger pulse source 9 which supplies the pulses for switching the multivibrator is coupled to the grid of the thyratron tube 24 through capacitors 34 and 35. This causes the thyratron 24 to conduct and to function as an electronic switch which discharges the network 27 through potentiometer 30, the thyratron 24 becoming non-conductive when the network 27 has discharged. The network 27 is recharged during the periods between the firing of the thyratron 24.

A pulse from the network 27 has a duration proportional to the length thereof, and the amplitude of which is equal to one-half the voltage to which the network 27 was charged.

The video pulses are taken off from the slider 32 of the potentiometer 30, which can be adjusted to vary the video pulse amplitudes, and to provide a choice of positive or negative video output.

The sliders of the potentiometers 12 and 13 can be adjusted to provide the desired difference in voltage to which the network 27 is charged on alternate trigger pulses. Adjustment of one potentiometer has very little effect upon the adjustment of the other.

Varying the charging voltage for the network 27 for alternate pulses thus varies the ampliturde of the alternate pulses before they are formed, and this eliminates any adverse effect upon pulse shape which likely would be introduced if the amplitude of the pulses was varied after formation.

One type of radar system does not lobe its antenna for every other pulse but receives several pulses on one beam before switching to the other. For simulating this condition, the circuit of Fig. 2 of the drawing has been provided. In this circuit the triggers for the multivibrator tubes 10 and 11 and for the thyratron tube 24 have been separated and the trigger pulses to the multivibrator tubes 10 and 11 are supplied thereto through a conventional counting circuit 40 which will deliver a trigger pulse to the multivibrator tubes 10 and 11 after N pulses, corresponding to the desired lobing. The thyratron tube 24 will fire on every trigger pulse so that the network 27 will provide N video pulses having the same amplitude, followed by N video pulses having a different amplitude.

The term "network" as used in the annexed claims is intended to apply to transmission lines used for forming pulses, as well as to lumped constant networks having the same electrical properties.

The term "electron tube" as used in the annexed claims is intended to apply to electron tube units where two or more of such units are contained in a common envelope, such, for example, as one unit of a dual triode.

We claim as our invention:

1. A pulse generator comprising a pulse-forming network, means including a first and a second electron tube for charging said network to different voltages, means including a third electron tube for discharging said network, and means for applying trigger pulses to said tubes.

2. A pulse generator comprising a pulse-forming network, means including a first and a second electron tube for charging said network to different voltages, means including a third electron tube for discharging said network, and triggering means for alternatively increasing the conductivity of said first and second tubes, and for causing said third tube to conduct after the conductivity of said first or second tube has increased.

3. A pulse generator comprising a pulse-forming network, means including a first and a second electron tube for charging said network to different voltages, means including a third electron tube for discharging said network, and means for periodically triggering said third tube and for triggering said first and second tubes following a plurality of triggerings of said third tube.

4. A pulse generator comprising a pulse-forming network, means including a first and a second electron tube for charging said network to different voltages, means including a third electron tube for discharging said network, means for applying trigger pulses to said tubes, said last-mentioned means including a counting circuit which applies trigger pulses to said first and second tubes of which the trigger pulses applied to said third switch are multiples, and means utilizing the trigger pulses from said counting circuit for alternatively increasing the conductivity of said first and second tubes.

5. A pulse generator comprising a pulse-forming network, means including a first and a second electron tube for charging said network to different voltages, means including a third electron tube for discharging said network, means for applying trigger pulses to said tubes for causing the conductivity of said first and second tubes alternatively to increase and to cause said third tube to conduct.

6. A pulse generator comprising a pulse-forming network, means including a first electron tube for charging said network to one voltage, and including a second electron tube for charging said network to a different voltage, means including a third electron tube for discharging said network, means for applying trigger pulses to said tubes, said last-mentioned means including a counting circuit which applies trigger pulses to said first and second tubes of which the trigger pulses applied to said third tube are multiples.

7. A pulse generator as claimed in claim 6 in which means is provided for causing the conductivity of said first and second switches alternatively to increase when pulses are applied from said counting circuit.

8. A pulse generator comprising an open-circuited transmission line type, pulse-forming network, means including a thyratron type tube for discharging said network, means for charging said network comprising a scale-of-two multivibrator circuit including two electron tubes which are alternatively energized when trigger pulses are applied to said circuit, said two tubes having anodes, an anode voltage source, resistors connecting said anodes to said source, adjustable means connecting said network to different points along said resistors, and means for applying trigger pulses to said circuit and to said thyratron tube.

9. A pulse generator comprising an open-circuited transmission line type, pulse-forming network, means including a thyratron type tube for discharging said network, means for charging said network comprising a scale-of-two multivibrator circuit including two electron tubes which are alternatively energized when trigger pulses are applied to said circuit, said two tubes having anodes, an anode voltage source, resistors connecting said anodes to said source, adjustable means connecting said network to the different points along said resistors, a counting circuit connected to said multivibrator circuit, and means for applying trigger pulses to said thyratron tube and to said counting circuit.

JOHN W. TAYLOR, Jr.
WILLIAM S. PARNELL.

REFERENCES CITED

The following references are of record in the file of this patent:

UNITED STATES PATENTS

| Number | Name | Date |
|---|---|---|
| 2,442,256 | Bartlett | May 25, 1948 |